(12) United States Patent
Liu et al.

(10) Patent No.: US 9,161,366 B2
(45) Date of Patent: Oct. 13, 2015

(54) METHODS AND DEVICES FOR CONFIGURING ANTENNA MODE FOR UPLINK COMMUNICATION

(75) Inventors: Jinhua Liu, Beijing (CN); Qingyu Miao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 33 days.

(21) Appl. No.: 13/988,146

(22) PCT Filed: Nov. 18, 2010

(86) PCT No.: PCT/CN2010/001846
§ 371 (c)(1),
(2), (4) Date: May 17, 2013

(87) PCT Pub. No.: WO2012/065282
PCT Pub. Date: May 24, 2012

(65) Prior Publication Data
US 2013/0242794 A1    Sep. 19, 2013

(51) Int. Cl.
H04W 4/00    (2009.01)
H04W 72/08   (2009.01)
H04B 7/04    (2006.01)
H04B 7/06    (2006.01)
H04B 17/12   (2015.01)

(52) U.S. Cl.
CPC ........... H04W 72/085 (2013.01); H04B 7/0404 (2013.01); H04B 7/0689 (2013.01); H04B 17/12 (2015.01)

(58) Field of Classification Search
CPC .................................................... H04W 72/085
USPC .................. 370/252–253, 328–339; 375/267
See application file for complete search history.

(56) References Cited

U.S. PATENT DOCUMENTS

| 7,746,943 | B2 | 6/2010 | Yamaura |
| 2004/0038713 | A1 | 2/2004 | Okawa et al. |
| 2005/0260954 | A1 | 11/2005 | Hamalainen et al. |
| 2006/0135079 | A1 | 6/2006 | Barnett et al. |
| 2007/0280340 | A1 | 12/2007 | Hwang et al. |

(Continued)

FOREIGN PATENT DOCUMENTS

| CN | 101841778 A | 9/2010 |
| CN | 101944940 A | 1/2011 |

(Continued)

OTHER PUBLICATIONS

Non-Final Office Action for U.S. Appl. No. 13/500,116, mailed Jan. 28, 2014, 7 pages.

(Continued)

Primary Examiner — Iqbal Zaidi
(74) Attorney, Agent, or Firm — Withrow & Terranova, PLLC (57) ABSTRACT

Methods and devices for configuring transmit antenna mode for a user equipment that can transmit in the uplink using at least two transmit antennas are provided. In accordance with embodiment a transmit antenna mode of the user equipment can be configured in response to a measured transmit antenna imbalance. Methods and devices for configuring transmit antenna mode for a user equipment that can transmit in the uplink using at least two transmit antennas are provided. In accordance with embodiment a transmit antenna mode of the user equipment can be configured in response to a measured transmit antenna imbalance.

19 Claims, 5 Drawing Sheets

(56) References Cited

U.S. PATENT DOCUMENTS

| | | | |
|---|---|---|---|
| 2008/0214128 | A1 | 9/2008 | Lim et al. |
| 2009/0239486 | A1 | 9/2009 | Sugar et al. |
| 2011/0053527 | A1* | 3/2011 | Hunzinger ............... 455/101 |
| 2012/0027112 | A1* | 2/2012 | Jiang et al. ............... 375/267 |
| 2012/0196637 | A1 | 8/2012 | Bergman et al. |
| 2013/0208704 | A1* | 8/2013 | Hultell et al. ............. 370/335 |

FOREIGN PATENT DOCUMENTS

| | | |
|---|---|---|
| EP | 2242304 A1 | 10/2010 |
| WO | 2010129610 A2 | 11/2010 |
| WO | 2011053220 A1 | 5/2011 |

OTHER PUBLICATIONS

Extended European Search Report for European Patent Application No. 10859733.7 mailed May 27, 2014, 7 pages.

3GPP TR 25.863, "3rd Generation Partnership Project; Technical Specification Group Radio Access Network; Universal Terrestrial Radio Access (UTRA); Uplink Transmit Diversity for High Speed Packet Access (HSPA) (Release 11)," V11.0.0., Dec. 2011, 222 pages.

Ericsson, "3rd Generation Partnership Project: TP for TR25.863 on Evaluation Methodology for HSPA UL Tx Diversity (R1-101303)", 3rd Generation Partnership Project (3GPP TSG RAN WG1 Meeting #60), Agenda Item: 5.5.3, Feb. 22-26, 2010, 22 pages, San Francisco.

Huawei, "3rd Generation Partnership Project: Concept of UL Closed Loop Transmit Diversity (R1-102931)", 3rd Generation Partnership Project (3GPP TSG-RAN WG1 Meeting #61), Agenda Item: 5.7, May 10-14, 2010, 6 pages, Montreal, Canada.

International Search Report and Written Opinion for PCT/CN2010/001846, mailed Aug. 4, 2011, 9 pages.

International Preliminary Report for PCT/CN2010/001846, mailed May 21, 2013, 7 pages.

Non-Final Office Action for U.S. Appl. No. 13/500,116, mailed Jul. 10, 2013, 7 pages.

Author Unknown, "UL multiple antenna transmission for LTE," 3GPP Work Item Description, 3GPP Organizational Partners, Dec. 5, 2009, 5 pages.

Author Unknown, "UL multiple antenna transmission for LTE core part," 3GPP Work Item Description, 3GPP Organizational Partners, Dec. 5, 2009, 5 pages.

Author Unknown, "UL multiple antenna transmission for LTE performance part," 3GPP Work Item Description, 3GPP Organizational Partners, Dec. 5, 2009, 5 pages.

* cited by examiner

METHODS AND DEVICES FOR CONFIGURING ANTENNA MODE FOR UPLINK COMMUNICATION

This application is a 35 U.S.C. §371 national phase filing of International Application No. PCT/CN2010/001846, filed Nov. 18, 2010, the disclosure of which is incorporated herein by reference in its entirety.

TECHNICAL FIELD

The present invention relates to methods and devices for configuring the transmit antenna mode for a user equipment transmitting using at least two transmit antennas.

BACKGROUND

Multiple-antenna technology is widely used in wireless communication systems such as cellular radio systems. For Long Term Evolution (LTE), Downlink (DL) Multiple Input Multiple Output (MIMO) was standardized by third generation partnership project (3 GPP) in release 8 (Rel 8 ). For Wideband Code Division Multiple Access (WCDMA) High Speed Packet Access (HSPA) evolution, downlink 2 by 2 MIMO was specified in Release 7 (Rel 7 ). The introduction of uplink multiple-antenna technology is being discussed in 3 GPP, including Uplink Transmit Diversity (ULTD) in WCDMA and uplink (UL) MIMO in LTE. With ULTD or UL MIMO, there will be at least 2 transmit (TX) antennas in the User Equipment (UE).

Known examples of ULTD include Switch Antenna Transmit Diversity (SATD) and Beam Forming Transmit Diversity (BFTD). For SATD, the UE transmits on the transmit (TX) antenna with better estimated uplink quality in terms of e.g. received Dedicated Physical Control Channel (DPCCH) power or DPCCH Signal to Interference plus Noise Ratio (SINR). For BFTD, the UE transmits on both TX antennas with an estimated weight factor to maximize received power or SINR. The ULTD technology can improve the system capacity and coverage, and save the UE battery consumption in most cases. There are two types of ULTD modes, Open Loop ULTD (OLTD) and Closed Loop ULTD (CLTD). In the latter case there is specific downlink feedback channel from the radio base station, Node B, to UE carrying the pre-coding vector or the information to assist the generation of pre-coding vectors of ULTD. For OLTD, there is no OLTD-specific downlink feedback channel from Node B to UE to support the ULTD operation. For CLTD, in order for the Node B to generate the desired pre-coding information to the UE over the specific downlink feedback channel, the Node B should also monitor the uplink channels. Traditionally the pre-coding vector is generated in the radio base station (Node B) side and sent to the UE. Alternatively the Node B can also send only the channel state information to UE, which in turn can autonomously create the pre-coding vector. Antenna imbalance is one key factor that impacts the system performance of OLTD, CLTD and UL MIMO.

OLTD for WCDMA-HSPA

For WCDMA-OLTD, the UE does the transmit adaptation of the 2 transmit antennas based on the available existing information. Algorithms for open loop SATD and for open loop BF are described in 3GPP Technical Report TR 25.863, "Uplink Tx Diversity for HSPA Study Item Technical Report".

In case of SATD, there are two TX antennas and single full-power power amplifier in the UE. With the scheme described in TR 25.863, the UE selects the TX antenna according to the TPC statistic as follows:

1. Let TPC command DOWN be represented by −1 and TPC command UP by +1. Then let the UE accumulate all received TPC commands.
2. At each frame border the accumulated TPC sum is compared with 0. If the sum is larger than 0 the transmit antenna is switched.
3. If the same transmit antenna has been used for x consecutive frames the UE automatically switches antenna. x can be referred as the forced switch circle and determined according to the radio environments.
4. Every time an antenna switch occurs the accumulated TPC sum is reset to 0.

In case of BFTD, there are two power amplifiers in the UE side. With the algorithm described in 3GPP R1-102931, Concept of UL Closed Loop Transmit Diversity, the UE adjusts the beam by adjusting the phase bias between two antennas based on the received TPCs in accordance with the following:

A. The phase offset, $\delta$, can be 48 degrees, $\epsilon$ can be 12 degrees.
B. Let TPC command DOWN be represented by −1 and TPC command UP by +1.
  1. Initial relative phase between two transmitters $\Delta\phi = -\delta/2$ for the first slot (#1 slot). $\epsilon$ is kept zero until two TPC commands become available to the UE.
  2. Apply relative phase for the next slot $\Delta\phi = \Delta\phi + \delta$
  3. Determine new relative phase:
    a. if TPC1>TPC2, $\Delta\phi = \Delta\phi + \epsilon$
    b. if TPC2>TPC1, $\Delta\phi = \Delta\phi - \epsilon$
    c. otherwise, no change
  Note that TPC1 and TPC2 correspond to slot (1,2 ), (3,4 ),. . .,($i*2 -1$ , $i*2$ ), where i=1 to n.
  4. Apply relative phase for the next slot $\Delta\phi = \Delta\phi - \delta$
  5. Go to step 2

A UL OLTD capable UE can be configured in default mode (fixed single TX antenna), OLTD mode (open loop SATD or BFTD).

CLTD in HSPA

CLTD was proposed in 3GPP RAN1-61 conference. The uplink closed loop transmit diversity scheme is based on the explicit uplink channel estimation and Channel Status Information (CSI) feedback was proposed. With this proposal, the network controls of the UE behavior and the adaptation of the transmit weights in a quickly. The simulation results show that the average throughput gain reaches 14% in Pedestrian A channel (3 km/h) and up to 10% in Vehicular A (30 km/h) channel. Overall CLTD can be a valuable complement that should be further considered for improving the HSPA uplink.

A UL CLTD UE can be configured in default TX antenna mode, open loop BFTD Mode and close loop BFTD mode.

UL MIMO in HSPA

For LTE, UL MIMO comprising of up to 4 transmit antennas in the UE is being specified, see RP-091430, UL multiple antenna transmission for LTE, work item, RAN#46. For WCDMA-HSPA, UL MIMO can be proposed naturally in 3GPP by companies after UL beam-forming is standardized since there is no hardware update for ULBF UE to support UL MIMO. In the current WCDMA-HSPA Node B, there are two receiver antennas. In the future, there can be even more receiver antennas and more advanced receiver technology that can be deployed in the network side, which means that there can be even larger gain from UL MIMO. For instance, the advanced receivers such as enhanced receiver Type 3 and interference cancellation technology can be deployed in the Node B side when the related cost is decreased to an acceptable level.

A UL MIMO capable UE can be configured in default single TX antenna mode, open loop BFTD Mode, close loop BFTD mode and UL MIMO mode.

There is a constant desire to improve upon existing transmission schemes. This is also true for configuration of uplink transmit diversity. Hence, there exist a need for an improved configuration of uplink transmit diversity

SUMMARY

It is an object of the present invention to provide an improved methods and devices to address the problems as outlined above.

This object and others are obtained by the methods and devices as set out in the appended claims.

Antenna Imbalance

Figure 3:
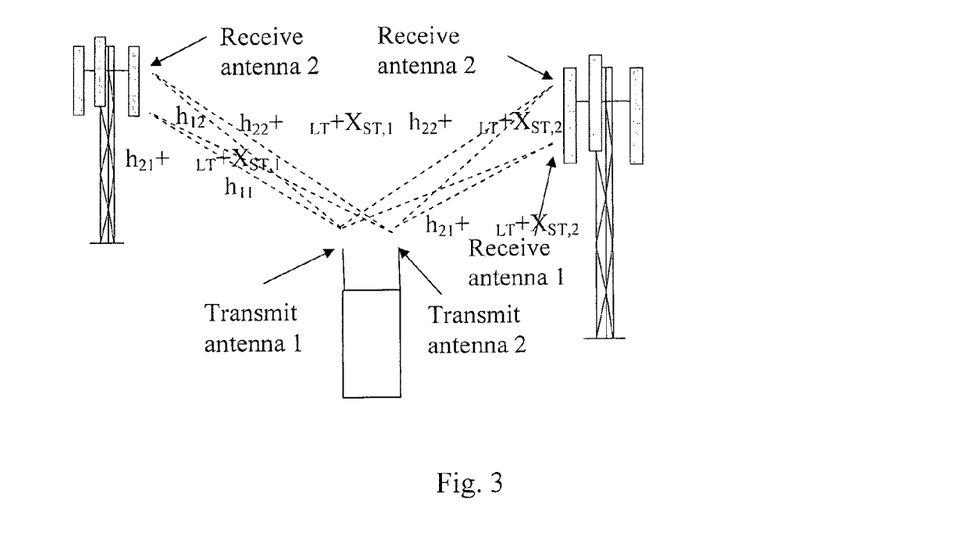
FIG. 3 illustrates antenna imbalance.

The antenna imbalance is the difference in characteristics between the 2 (or more) TX antennas of UE, which includes Long-term Antenna Imbalance (LAI) & Short-term Antenna Imbalance (SAI). The antenna imbalance is defined as the ratio of the uplink channel strength of the second TX antenna to that of the first TX antenna of UE in TR 25.863. This is illustrated in FIG. 3 see also R1-101303 TP for TR25.863 on evaluation methodology for HSPA UL Tx Diversity, RAN1-60. LAI, also termed slow term antenna imbalance, is UE specific and determined by antenna design and manufacturing, which is attributed to difference in antenna efficiency and form factors. SAI varies quickly e.g. location, body effects and antenna imperfections. Taking the first antenna as the reference, LAI 0 dB means the second antenna is as good as the first antenna and LAI −4 dB means the second antenna is −4 dB worse than the first antenna.

The antenna imbalance can have bad impact on the performance of the system and the UE. In the 3GPP technical report TR 25.863 Uplink Tx Diversity for HSPA Study Item Technical Report, plenty of system simulation results about open loop SATD and BFTD have been shown by many companies. In this technical report, both OLTD (SATD and BFTD) has shown clear system throughput gain as well as the considerable gain of user throughput at the cell edge with LAI 0 dB. Meanwhile, there is also considerable UE power saving gain, which means UE can save some power with OLTD. While with LAI −4 dB, the practical OLTD shows no or a clear negative system throughput gain and a loss of UE TX power in many cases.

Although the antenna imbalance is not desired, it can not be avoided. Moreover, since there are thousands of UE types in the market, it is very hard to control the antenna imbalance even if there is a specified antenna imbalance restriction in 3GPP.

As has been recognized by the inventors, when there is a large antenna imbalance for a UE in any mode of SATD, BFTD and UL MIMO, the system can suffer performance loss and the UE can suffer the UL TX power and cell edge throughput loss due to the use of worse antenna.

For instance, when the antenna imbalance reaches a certain level different undesired effects can occur:

For a UE in BFTD and UL MIMO, there can be UL cell edge throughput and TX power loss for the UE, and UL throughput loss for the system due to half of UE TX power is allocated on the worse TX antenna.

With the SATD, it is likely that only the open loop SATD will be deployed. With open loop SATD, the UE has to transmit with the worse antenna more or less frequently in order to detect which antenna is better in a certain period.

Also, the antenna imbalance can result in Rise over Thermal (RoT) oscillation when a UE in SATD.

The inventors have realized that in order to ensure the uplink stability and improve the power utilization efficiency UE, it is better that the network side (either the Radio Network controller RNC or the serving Node B) is given control over the UE TX antenna mode and consider the impact of an antenna imbalance. The network today does not know the antenna imbalance.

Thus, in accordance with one embodiment a method in a cellular radio network node of configuring transmit antenna mode for a user equipment connected to the network is provided. The user equipment can transmit in the uplink using at least two transmit antennas and the method comprises configuring a transmit antenna mode of the user equipment in response to a measured transmit antenna imbalance. Hereby the transmit antenna mode in the uplink can be configured taking into account the present antenna imbalance.

In accordance with one embodiment the transmit antenna mode of the user equipment is configured for a user equipment applying a closed loop uplink transmit diversity.

In accordance with one the radio network node is arranged to measure the slow varying antenna imbalance.

In accordance with one embodiment the antenna imbalance is measured by the serving radio base station.

In accordance with one embodiment the antenna imbalance is also measured by a non-serving radio base station.

In accordance with one the configuring of the antenna mode comprises transmitting the transmit antenna mode to be used by the UE in a configuration message. The configuration message can be signaled using for example Radio Resource Control signaling, a High Speed Shared Control Channel order, or a in a Media Access Control header.

In accordance with one embodiment the network node is a radio base station or a radio network controller.

In accordance with one embodiment a method in a user equipment adapted to be connected to a cellular radio network is provided. The user equipment can be adapted to transmit in the uplink using at least two transmit antennas. The method can comprise receiving a message for setting a transmit antenna mode from the cellular radio network, and configuring the transmit antenna mode in response to the message received. In accordance with one embodiment the message is received by radio Resource Control signaling, a High Speed Shared Control Channel order, or a Media Access Control header.

In accordance with embodiments of the invention, the network measures the antenna imbalance of a UL MIMO capable UE and configures the UE in a proper TX antenna mode to eliminate the utilization of the worse TX antenna based on the antenna imbalance. For example the radio base station Node B can measure the antenna imbalance in UL CLTD/MIMO mode. In response to such measurements the network can set a TX antenna mode configuration for the UE, which is then based on the measured antenna imbalance.

For example, a network node, such as a radio base station, Node B can be arranged to measure the slow varying antenna imbalance (i.e. long-term antenna imbalance) for UEs in UL CLTD/MIMO mode. The network can then be arranged to via the radio base station configure the UE to a proper TX antenna mode to reduce the utilization of the worse antenna and increase the use of the best antenna conditionally when there is determined to exist an antenna imbalance.

The invention also extends to a network node such as a radio base station Node B or a Radio Network Controller (RNC) arranged to perform the above configuration of uplink transmission mode for a user equipment using at least two transmit antennas. The invention also extends to a User Equipment arranged to perform transmit antenna mode configuration in accordance with the above methods. The network node and/or the User equipment can be provided with a controller/controller circuitry arranged to perform the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
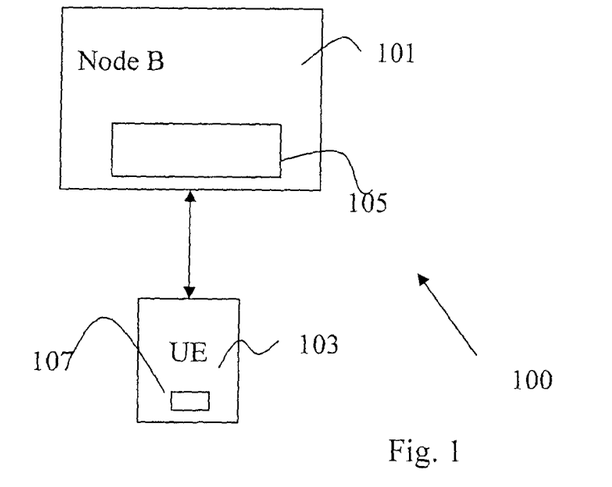
FIG. 1 is a view of a cellular radio system.

In FIG. 1 a general view of a cellular radio system 100 is depicted. The system 100 depicted in FIG. 1 is a UTRAN system. However it is also envisaged that the system can be an E-UTRAN system or another similar systems. The system 100 comprises a number of base stations 101, whereof only one is shown for reasons of simplicity. The base station 101 can be connected to by user equipments in the figure represented by the UE 103 located in the area served by the base station 101. The base stations 101 can further be connected to a central network node such as a Radio Network Controller (not shown). The system 100 is further configured for multi carrier operation in at least the uplink. The base station and the user equipment further comprise controllers/controller circuitry 105 and 107 for providing functionality associated with the respective entities. The controllers 105 and 107 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

In accordance with one embodiment the network side performs antenna imbalance measurement for a UE, for example a UE in UL CLTD/MIMO mode. The network is arranged to set the transmit antenna mode configuration of the UE based on the antenna imbalance measured by the network for example in a network node such as a serving Node B or an RNC connected to the radio base station Node B.

Figure 2:
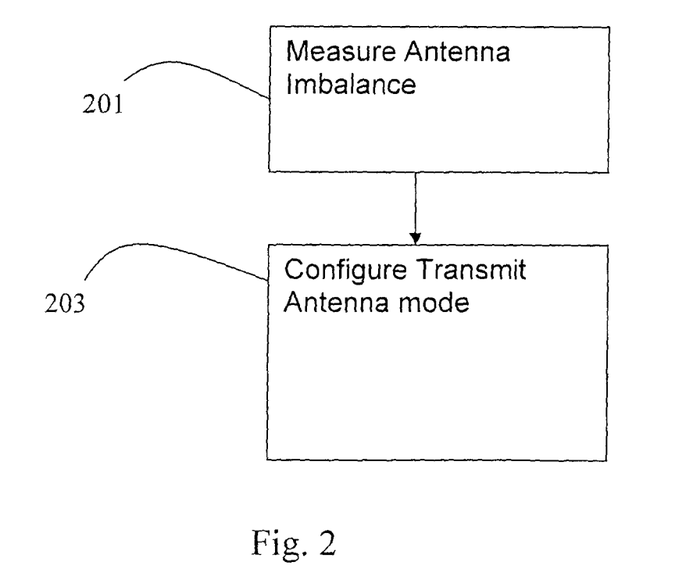
FIG. 2 is a flow chart depicting different steps performed when configuring a transmit antenna mode.

With reference to FIG. 2 the following steps can be performed when setting a transmit antenna mode for a UE having at least two antennas for uplink transmission. First, in a step 201, the antenna imbalance of the user equipment is measured. Thereupon, in a step 203 a transmit antenna mode of the user equipment is configured in response to the measured imbalance. For example a network node, such as a radio base station Node B or a radio network controller (RNC) can set the transmit antenna mode for a UE in response to a measurement of the antenna imbalance of the UE and then signal the transmit antenna mode to the UE which UE can be configured to apply the transmit antenna mode set by the network node received from the network. The signaling can for example be performed using Radio resource Control (RRC) signaling, a High Speed Shared Control Channel (HS-SCCH) order, a media access Control (MAC) header, etc.

Figure 8:
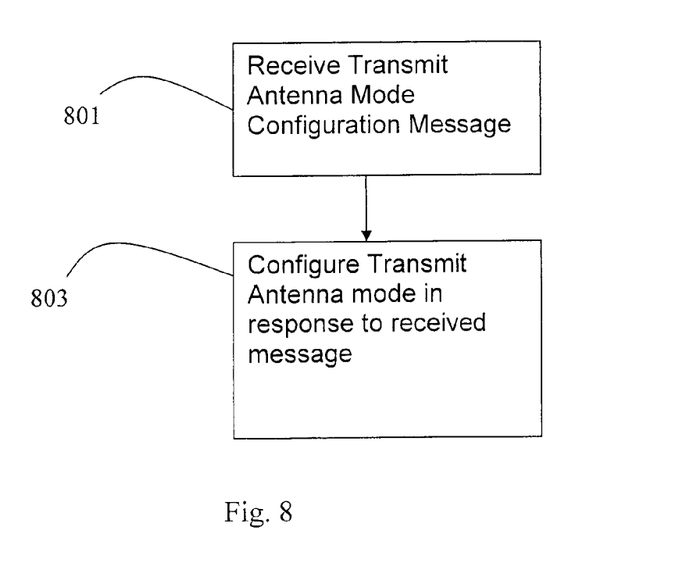
FIG. 8 is a flow chart illustrating configuring of antenna mode in a UE.

In FIG. 8 some procedural steps that can be performed in a user equipment when configuring antenna mode are depicted. First in a step 801 a message for setting the antenna mode in a user equipment having at least two antennas is received from a cellular radio network. Next, in a step 803, the user equipment configures the transmit antenna mode in response to the message received in step 801.

Below some detailed examples of transmit antenna mode configuration are given. The examples given hereinafter are described with a two-TX-antenna UE in WCDMA-HSPA system. However the invention is applicable for UEs with more than two-TX-antennas and UEs in other systems than WCDMA-HSPA system such as LTE.

In accordance with one embodiment, regardless if a UE, such as a UE in UL CLTD/MIMO mode, is in soft handover or not, a network node, such as the serving radio base station Node B can be arranged to measure the antenna imbalance of the UE. In particular the radio base station can be set to measure the long-term antenna imbalance of the UE. In addition the antenna imbalance can be measured by a non serving radio base station for the UE.

Without loss of generality, the antenna imbalance can be defined as Equation 1

$$AI = g_{Ant2} - g_{Ant1} \qquad \text{Equation 1}$$

where AI is antenna imbalance, $g_{Ant1}$ is the path gain of the first TX antenna and $g_{Ant2}$ is the path gain of the second TX antenna.

Below some detailed examples are given.

Figure 4:
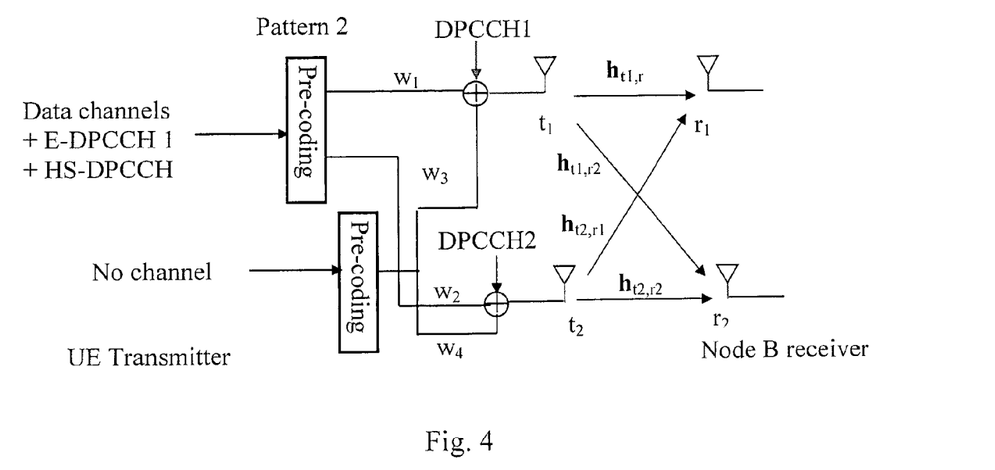
FIGS. 4 and 5 illustrates different transmission scenarios.

In FIG. 4 transmission of Dedicated Physical Control Channel (DPCCH) is considered for a scenario without precoding is illustrated. When DPCCH is not precoded, DPCCH 1 is mapped one antenna and DPCCH 2 is mapped on the other antenna. An example to estimate the antenna imbalance based on the measurements of the two DPCCHs is described below.

According to the above definition of the antenna imbalance, the serving Node B can measure the antenna imbalance based on the uplink DPCCH quality e.g. DPCCH Signal to Interference plus Noise ration (SINR), DPCCH Received Signal Code Power (RSCP), DPCCH Signal to Noise ratio (SNR), and the estimated DPCCH transmit (TX) power difference, with a certain filter. This is shown in Equation 2 assuming that the two TX antennas have the same initial TX power.

$$AI = SINR_{DPCCH,Ant2} - SINR_{DPCCH,Ant1} + \quad \text{Equation 2}$$
$$Step_{ILPC}\left(\sum_{\text{in meas period}} TPC_{Ant1} - \sum_{\text{in meas period}} TPC_{Ant2}\right)$$

where AI is the antenna imbalance, $SINR_{DPCCH,Ant2} - SINR_{DPCCH,Ant1}$ is the DPCCH SINR difference between two UE TX antennas, $Step_{ILPC}$ is the step size of Inner Loop Power Control (ILPC), $$Step_{ILPC}\left(\sum_{\text{in meas period}} TPC_{Ant1} - \sum_{\text{in meas period}} TPC_{Ant2}\right)$$

is the estimated DPCCH TX power difference between two UE TX antennas. Equation 2 includes both the DPCCH SINR difference and the estimated DPCCH TX power difference between two TX antennas because both the DPCCH power and SINR are dependent on the configured TX antenna mode and Inner Loop Power Control (ILPC) design.

For UL CLTD/MIMO mode, the two UE antennas use different uplink pilots or spreading codes. The following are two examples to implement ILPC:

Example 1 Single ILPC loop is used for the DPCCHs of both TX antennas of UE. In this case, the same TPCs are used for both DPCCHs over the two TX antennas. The DPCCH powers for both TX antennas of UE are the same. Equation 2 can be simplified as Equation 3.

$$AI = SINR_{DPCCH,Ant2} - SINR_{DPCCH,Ant1} \quad \text{Equation 3}$$

The antenna imbalance measurement should be performed at least once after the serving radio link set setup or the serving Node B is changed. The measurement period is preferably long enough to identify the slow varying antenna imbalance, e.g. 300 ms or even longer.

Example 2 Separate ILPC loop is used for DPCCH over the two TX antennas of UE. In this case, the DPCCH TX powers of two TX antenna of UE are different and the average DPCCH SINR's of two TX antenna of UE are the same. Assume the DPCCH initial powers of two TX antennas are the same, the DPCCH power difference can be estimated based on the TPC commands sent by the serving Node B. Equation 2 can be simplified as Equation 4.

$$AI = Step_{ILPC}\left(\sum_{\text{in meas period}} TPC_{Ant1} - \sum_{\text{in meas period}} TPC_{Ant2}\right) \quad \text{Equation 4}$$

In this case, the antenna imbalance can be measured after the radio link set setup of the serving Node B. For a UE in soft handover, the accuracy of antenna imbalance measurement is affected since the Transmit Power Control (TPC) commands from the non-serving Node Bs also contribute to DPCCH power control.

Figure 5:
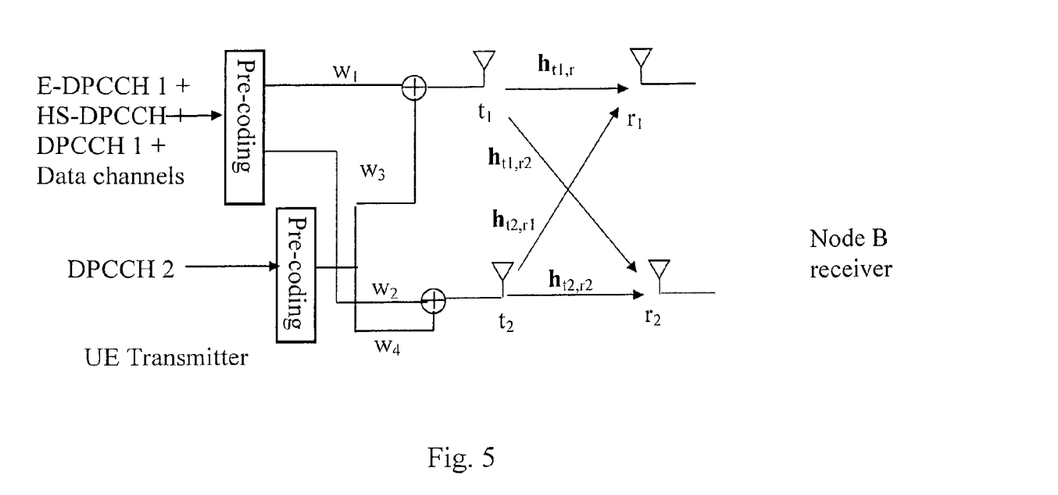

In FIG. 5 transmission of Dedicated Physical Control Channel (DPCCH) is considered for a scenario with precoding is illustrated.

FIG. 5 shows a CLTD structure when the DPCCH: s are precoded. In this case, only composite channels for DPCCH 1 and DPCCH 2 can be monitored by the Node B.

The precoding matrix is expressed in Equation 5

$$W = \begin{bmatrix} w_1 & w_3 \\ w_2 & w_4 \end{bmatrix} \quad \text{Equation 5}$$

Where W is the precoding matrix.

Due to the DPCCH:s are precoded, the composite channel matrix as Equation 6 can be estimated in the Node B, $$\tilde{H} = HW = \begin{bmatrix} h_{r1,t1}w_1 + h_{r1,t2}w_2 & h_{r1,t1}w_3 + h_{r1,t2}w_4 \\ h_{r2,t1}w_1 + h_{r2,t2}w_2 & h_{r2,t1}w_3 + h_{r2,t2}w_4 \end{bmatrix} \quad \text{Equation 6}$$

Where $\tilde{H}$ is the composite channel matrix.

Then, the explicit channel matrix can be calculated by removing the precoding as expressed in Equation 7

$$H = \tilde{H}W^{-1} = \begin{bmatrix} h_{r1,t1} & h_{r1,t2} \\ h_{r2,t1} & h_{r2,t2} \end{bmatrix} \quad \text{Equation 7}$$

Where H is explicit channel matrix;

According to the above definition of the antenna imbalance, the antenna imbalance can be estimated by Equation 8:

$$AI = \ln 2db(|h_{t2,r1}|^2 + |h_{t2,r2}|^2) - \ln 2db(|h_{t1,r1}|^2 + |h_{t1,r2}|^2) \quad \text{Equation 8}$$

Filtering of Antenna Imbalance

In accordance with one embodiment, the serving radio base station Node B is arranged to only take the slow varying antenna imbalance, e.g. the long-term antenna imbalance. Firstly, SAI varies too fast to be followed. Secondly, for any configured TX antenna mode of open loop ULTD and no-code book based UL CLTD/MIMO, the UE needs considerable time before the weight factor is converged. During the period of convergence, there is performance loss from both the system and the UE perspective. Thirdly, there is a signaling overhead increase in downlink with frequent UE TX antenna mode change. Based on the above, the TX antenna mode of a UE should not be changed too frequently and the serving Node B should focus on the measurement of slow varying antenna imbalance.

With the network (nodes in the network focusing on the slow varying antenna imbalance (e.g. long-term antenna imbalance) the result is less frequent change of UE TX antenna mode. A frequent change of UE TX antenna mode should be avoided for a number of reasons such as:

The short-term antenna imbalance charges too fast to be followed by TX antenna mode change.

For any TX antenna mode of open loop ULTD, non-code book based UL CLTD/MIMO, it takes a considerable time before the antenna weight factor is adapted to proper range.

The signaling overhead is increased with frequent change the UE TX antenna mode.

In accordance with one embodiment a filter can be used to estimate the long-term antenna imbalance. For example an attack decay filter as Equation 9 can be used.

$$AI'(n) = AI'(n-1)(1-\alpha) + \alpha \cdot AI(n) \quad \text{Equation 9}$$

Where AI'(n) is the filtered antenna imbalance in the current antenna imbalance measured period, AI'(n−1) is the filtered antenna imbalance in the last antenna imbalance measured period, AI(n) is the measured antenna imbalance in the current antenna imbalance measured period and α is the forgetting factor from 0 to 1.

The forgetting factor can be configured to different value with different environments.

Selection of TX Antenna Mode

Figure 6:
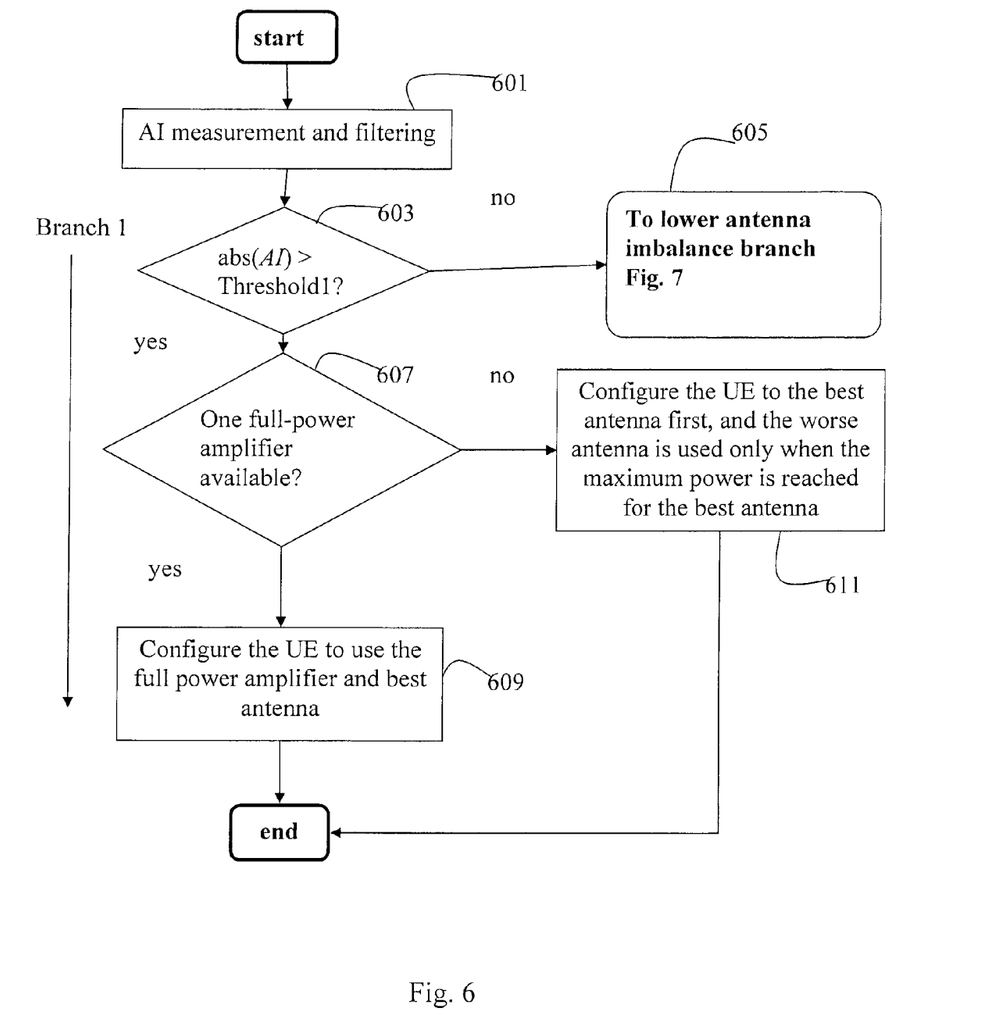
FIGS. 6 and 7 are flow charts depicting different steps performed when configuring transmit antenna modes.
Figure 7:
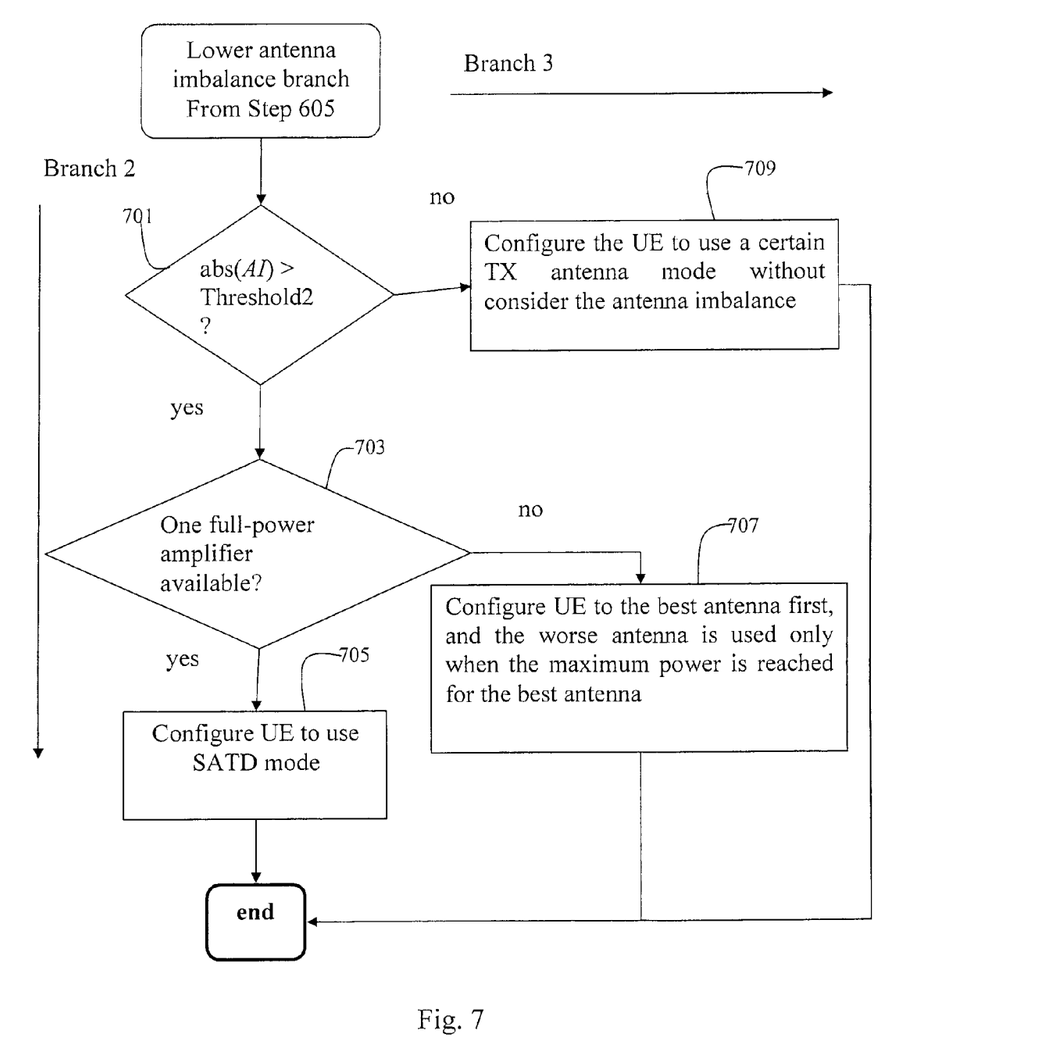

In accordance with one embodiment, only the serving Node B or the RNC is allowed to configure the antenna TX antenna mode for a ULTD/MIMO capable UE based on a measured varying antenna imbalance, in particular the slow variation Flowcharts illustrating UE TX antenna mode selection are shown in FIGS. 6 and 7.

Branch 1 High Antenna Imbalance Branch

This branch, i.e. the branch of the flowchart of FIGS. 6 and 7 that illustrates detection of a high antenna imbalance, is shown in FIG. 6. First in a step 601 the antenna imbalance is measured and potentially filtered using some suitable filter. The measured antenna imbalance (AI) is then in a step 603 compared to a first threshold here denoted Threshold1, which is a high antenna imbalance threshold. Thus, if the first threshold Threshold1 is exceeded the antenna imbalance is determined to be high. If the outcome in step 603 is that the antenna imbalance is not high the procedure continues to a step 605 which is further described below in conjunction with FIG. 7.

When the measured antenna imbalance is higher than Threshold1, the use of the worse antenna can result in a large power waste of UE and also the system performance loss due to the large antenna imbalance. For example, for UL BFTD and MIMO, there is always one half TX power allocated on the worse TX antenna. For open loop SATD, the worse TX antenna is occasionally used because of the forced antenna switch and the wrong antenna switch due to e.g. dip fading or TPC error or TPC delay or sometimes the TPC command is not generated according to the uplink DPCCH quality but the uplink overloading status with fast congestion control.

Thus, if it is determined that the antenna imbalance is high in step 603 the procedure continues to a step 607. In step 607 it is determined if one full-power amplifier is available. In this case, if there is a full-power amplifier, the serving Node B or the RNC is arranged to configure the UE, via suitable signaling (e.g. RRC signaling, HS-SCCH order, MAC header, etc), to use the best TX antenna and the full-power amplifier in a step 609. A full-power amplifier is an amplifier that can output the maximum allowed TX power of the UE for the carrier to be used. Otherwise, if there is no full power amplifier, e.g. only two half-power amplifier are available in the case of two transmit antennas, the UE can be configured to use the power capability of the best antenna first before using second best antenna in a step 611. This means that the worse antenna(s) should not be used until the maximum TX power of the best antenna is reached.

Branch 2 Middle Antenna Imbalance Branch

This branch is shown in FIG. 7 which continues from step 605 in FIG. 6 if it is determined that there is no high antenna imbalance. The measured antenna imbalance is compared to a second, middle antenna imbalance, threshold, Threshold2 in a step 701. If the measured antenna imbalance is higher than Threshold2 but lower than Threshold1, there is still considerable power waste for the UE if the worse TX antenna is used too often, e.g. UL BFTD or MIMO. When the antenna imbalance is in this range, the worse antenna can occasionally have considerably better path gain compared to the best antenna in a period due to the channel fading, which means SATD mode can benefit in this situation. Compared to the proposed method in high antenna imbalance, the SATD can be selected for the UE.

If there is a full-power amplifier as determined in a step 703, the UE can be configured to use the-full-power amplifier and SATD mode in a step 705. If there are only two half power amplifiers, the UE can be still be configured to use SAID. The worse antenna can be allowed to be used to compensate the absent TX power if the selected best antenna reaches the maximum TX power in a step 707.

Branch 3 Low Antenna Imbalance Branch

This branch is also illustrated in FIG. 7. if the measured antenna imbalance is lower than the second threshold Threshold2 as determined in step 701, the antenna imbalance is in an acceptable level, the network can configure the UE TX antenna mode without considering the antenna imbalance in a step 709.

Using the methods and devices as described herein can ensure that a proper TX antenna mode can be configured with antenna imbalance considered. This in turn results in that that the cell edge rate of the UEs with antenna imbalance can be improved. Or equivalently, the coverage of the UEs with antenna imbalance can be ensured. Also, the UE TX power utilization efficiency of the UEs with antenna imbalance can be improved and the system performance in uplink can be improved with there are UEs with antenna imbalance in the system.

The invention claimed is:

1. A method in a cellular radio network node of configuring a transmit antenna mode for a user equipment (UE) connected to a network, wherein the user equipment can transmit in an uplink using at least two transmit antennas, the method comprising:
   if it is determined that a measured transmit antenna imbalance, measured by a node of the network, is above a first threshold value, configuring the transmit antenna mode of the user equipment to use the best transmit antenna of the at least two transmit antennas and a full-power amplifier; and
   if there is no full power amplifier, configuring the transmit antenna mode of the user equipment to use a power capability of the best antenna before using a worse antenna.

2. The method according to claim 1, wherein the transmit antenna mode of the user equipment is configured for a user equipment applying a closed loop uplink transmit diversity.

3. The method according to claim 1, wherein the node is the cellular radio network node and the cellular radio network node is arranged to measure a slow varying antenna imbalance.

4. The method according to claim 1, wherein the node is a serving radio base station and the measured transmit antenna imbalance is measured by the serving radio base station.

5. The method according to claim 4, wherein the node is a non-serving radio base station and the measured transmit antenna imbalance is also measured by the non-serving radio base station.

6. The method according to claim 1, wherein the configuring of the transmit antenna mode comprises transmitting the transmit antenna mode to be used by the UE in a configuration message.

7. The method according to claim 6, wherein the configuration message is signaled using radio Resource Control signaling, a High Speed Shared Control Channel order, or a Media Access Control header.

8. The method according to claim 1, wherein the network node is a radio base station or a radio network controller.

9. The method according to claim 1, wherein the node is the cellular radio network node.

10. The method according to claim 1, wherein the node is a serving radio base station.

11. The method according to claim 1, wherein the node is a non-serving radio base station.

12. A cellular radio network node arranged to configure a transmit antenna mode for a user equipment (UE) connected to a network, wherein the user equipment can transmit in an uplink using at least two transmit antennas, the network node comprising:
- a processor; and
- a memory coupled to the processor, the memory containing instructions executable by the processor whereby the cellular radio network node is operative to:
  - if it is determined that a measured transmit antenna imbalance, measured by a node of the network, is above a first threshold value, the transmit antenna mode of the user equipment is configured to use the best transmit antenna of the at least two transmit antennas and a full-power amplifier; and
  - if there is no full power amplifier, the transmit antenna mode of the user equipment is configured to use a power capability of the best antenna before using a worse antenna.

13. The network node according to claim 12, wherein the cellular radio network node is operative to configure the transmit antenna mode of the user equipment for a user equipment applying a closed loop uplink transmit diversity.

14. The network node according to claim 12, wherein the node is the cellular radio network node and the cellular radio network node is operative to measure a slow varying antenna imbalance.

15. The network node according claim 12, wherein the node is a serving radio base station and the measured transmit antenna imbalance is measured in the serving radio base station.

16. The network node according to claim 15, wherein the node is a non-serving radio base station and the measured transmit antenna imbalance is also measured in the non-serving radio base station.

17. The network node according to claim 12, wherein the cellular radio network node is operative to configure the transmit antenna mode by transmitting the transmit antenna mode to be used by the UE in a configuration message.

18. The network node according to claim 17, wherein the cellular radio network node is operative to signal the configuration message using radio Resource Control signaling, a High Speed Shared Control Channel order, or a Media Access Control header.

19. The network node according to claim 12, wherein the network node is a radio base station or a radio network controller.

* * * * *